United States Patent

Eichenauer et al.

[11] Patent Number: 5,486,583
[45] Date of Patent: Jan. 23, 1996

[54] DEFOAMING COMPOSITIONS FOR ABS LATICES

[75] Inventors: Herbert Eichenauer, Dormagen; Karl-Erwin Piejko, Bergisch Gladbach; Hans-Jürgen Bunte, Krefeld; Hans-Jürgen Thiem, Dormagen, all of Germany

[73] Assignee: Bayer Aktiengesellschaft, Leverkusen, Germany

[21] Appl. No.: 350,695

[22] Filed: Dec. 7, 1994

[30] Foreign Application Priority Data

Dec. 17, 1993 [DE] Germany ............... 43 43 207.7

[51] Int. Cl.$^6$ .................... C08K 5/36; B01D 19/04
[52] U.S. Cl. .................... 526/68; 252/321; 252/358; 252/174.21; 523/328; 524/303; 524/742; 524/750; 524/751; 524/821; 524/828
[58] Field of Search ............ 526/68; 252/174.21; 524/742, 750, 821, 828, 303; 523/328

[56] References Cited

U.S. PATENT DOCUMENTS

| | | | |
|---|---|---|---|
| 3,657,136 | 4/1972 | Lieberman et al. | 252/321 |
| 4,193,903 | 3/1980 | Giddings et al. | 524/828 |
| 4,631,145 | 12/1986 | Zychal | 252/321 |
| 5,223,177 | 6/1993 | Töpfl et al. | 252/321 |

FOREIGN PATENT DOCUMENTS 378049 7/1990 European Pat. Off. .

*Primary Examiner*—Veronica P. Hoke
*Attorney, Agent, or Firm*—Connolly & Hutz

[57] ABSTRACT

A mixture which is suitable as a defoamer, especially for ABS latices, comprising (A) a $C_{10}$–$C_{20}$ alcohol, (B) a mineral oil, (C) an ester from a thiodicarboxylic acid with 4 to 8 carbon atoms and a $C_{10}$–$C_{20}$ alcohol and (D) a non-ionic emulsifier and a process for removing residual monomers from ABS latices using these defoaming mixtures.

5 Claims, No Drawings

DEFOAMING COMPOSITIONS FOR ABS LATICES

Emulsion polymerisation of olefinically unsaturated monomers to produce thermoplastic moulding compounds generally proceeds to conversions of >99.5% when the reaction is controlled efficiently. Nevertheless, it is necessary, for a few applications of moulding compounds (e.g. the production of moulded items with extremely small proportions of volatile components or the production of plastic parts which come into contact with foodstuffs), to remove, as quantitatively as possible, the monomers still present in the polymer. Whereas, in the case of polymers produced by solution polymerisation, it is easy to remove the residual monomers (preferably under vacuum) during the working up stage, i.e. removal of the solvent, and optionally to return them to polymerisation reactions, in emulsion polymerisation this is possible only after reaction at the latex stage or after working up, preferably during the drying procedure (e.g. spray drying).

Monomers removed during drying can be recovered only with difficulty. On the other hand, it is technically simpler to return monomers removed at the latex stage, by latex degassing, to the polymerisation reaction.

In this case, however, it is a hindrance that polymerisation emulsions (latices) foam up very readily due to the emulsifiers contained therein (emulsifiers have surfactant properties), particularly under the degassing conditions required for removal of monomers (e.g. application of a vacuum or the passage of steam).

Numerous additives ("defoamers") have been described in the literature for inhibiting the foaming of surfactant-containing aqueous compositions (see e-g. Surfactant Science Series, vol. 45: Defoaming - Theory and Industrial Applications, P. R. Garret (Ed.), Marcel Dekker, Inc., New York, Basel, Hong Kong, 1993). Products based on silicones are mostly used as efficient defoamers for polymer latices. These are not suitable for ABS polymers, however, because they have an adverse effect on their properties (e.g. the yield stress).

Nitrogen-containing defoamers (amines, amides) are just as unsuitable because these lead to discoloration of the ABS polymers and greatly restrict the possibility of using them as mixing components in polymer blends (e.g. admixed with polycarbonates).

Thus there is a need for a highly effective defoaming composition for ABS polymer latices which enables effective removal of residual monomers by conventional degassing techniques without the latex foaming up and without a deterioration in the properties of the ABS polymer.

The invention provides a mixture which is suitable as a defoamer comprising

A) a $C_{10}$–$C_{20}$ alcohol,
B) a mineral oil,
C) an ester from a thiodicarboxylic acid with 4 to 8 carbon atoms and an alcohol with 10 to 20 carbon atoms and
D) a non-ionic emulsifier.

This mixture preferably contains 30 to 85 parts by wt. of A, 5 to 30 parts by wt. of B, 5 to 40 parts by wt. of C and 2 to 15 parts by wt. of D, and particularly preferably 40 to 80 parts by wt. of A, 7.5 to 25 parts by wt. of B, 10 to 30 parts by wt. of C and 3 to 15 parts by wt. of D.

Defoaming mixtures according to the invention may be used as a mixture of components A, B, C and D or in the form of aqueous emulsions or dispersions of the mixture of components A, B, C and D.

Aqueous emulsions or dispersions of the defoaming mixture preferably contain 1 to 60 wt. %, particularly preferably 3 to 50 wt. % and in particular 5 to 30 wt. %, of solids.

The invention also provides a process for removing residual monomers from ABS latices in which the defoaming mixtures according to the invention are added to ABS latex and the latex is then degassed in a manner known per se.

Suitable as the alcohol component A are the so-called fatty alcohols, i.e. saturated and unsaturated aliphatic monoalcohols with 10 to 20 carbon atoms. Examples of this type of compound are decanol, dodecanol, tetradecanol, hexadecanol, octadecanol, octadecenol, with octadecanol, octadecenol or mixtures thereof preferably being used.

Mineral oils which can be used as component B are e.g. hydrocarbon oils, preferably paraffin oil.

Thiodicarboxylates based on $C_{10}$–$C_{20}$ alcohols, especially those defined under A, are used as component C. 2,2'-thiodiacetic acid and 3,3'-thiodipropionic acid are particularly suitable as thiodicarboxylic acids. Examples of thiodicarboxylates are: didodecyl thiodipropionate, ditetradecyl thiodipropionate and dioctadecyl thiodipropionate.

Suitable non-ionic emulsifiers (component D) are e.g. ethoxylated fatty alcohols, propoxylated fatty alcohols, ethoxylated fatty acids, propoxylated fatty acids, ethoxylated alkylphenols, propoxylated alkylphenols, e.g. alkoxylated nonylphenol. Alkoxylated fatty alcohols are preferred.

Defoaming mixtures according to the invention are added to the ABS polymers, which are in the latex form, in amounts of 100 to 10,000 ppm, preferably 250 to 5,000 ppm and in particular 500 to 2,000 ppm (each being with reference to the ABS solids).

In this event, addition to the ABS latex can take place at any time between finishing latex production and degassing the latex, the composition preferably being added shortly before degassing.

The temperature at which the defoaming mixture is added to the ABS latex is similarly non-critical, it can be selected to be anywhere between room temperature and 100° C.

The latices may be degassed by conventional processes, preferably in columns with a sieve tray under the effect of steam.

Defoaming mixtures according to the invention are highly effective, but do not impair the properties of ABS moulding compounds and are in principle suitable for all ABS latices which have been prepared using anionic emulsifiers.

Examples of this type of emulsifier are alkylsulphates, alkylsulphonates, aralkylsulphonates, soaps of saturated or unsaturated fatty acids and alkaline disproportionated or hydrogenated abietic or tall oil acids or soaps of dicarboxylic acids in accordance with DE-OS 36 39 904 and DE-OS 39 13 509.

ABS polymers for which the defoaming mixtures may be used are preferably products which are obtained by radical emulsion polymerisation of styrene and acrylonitrile in the presence of polybutadiene latex (so-called graft products). Here, the graft monomers styrene and acrylonitrile may be fully or partially replaced by α-methylstyrene and/or methylmethacrylate; in addition, the graft products may be mixed with separately prepared latices of resin-like polymers.

Examples of this type of resin-like polymer are styrene/acrylonitrile copolymers, α-methyl styrene/acrylonitrile copolymers, methylmethacrylate/acrylonitrile copolymers, methylmethacrylate/styrene copolymers and styrene/α-methylstyrene/acrylonitrile polymers.

EXAMPLES

The examples were performed using the following ABS latex:

ABS latex produced by radical emulsion polymerisation of 45 parts by wt. of a monomer mixture of styrene and acrylonitrile (ratio by wt. 72:28) in the presence of 55 parts by wt. of a polybutadiene latex with an average particle diameter $d_{50}$ of 405 nm using 3 parts by wt. of the sodium salt of disproportionated abietic acid (Dresinate 731) as emulsifier. Solids content of the latex ca. 35 wt. %.

Components used for preparing the defoaming mixtures:

Alcohol component A1: octadecanol Alcohol component A2: octadecenol

Mineral oil component Bi: paraffin oil (Tudalen 932, Hansen and Rosenthal, Hamburg)

Thiodicarboxylate component CI: didodecyl thiodipropionate Thiodicarboxylate component CI: didodecyl thiodipropionate (Irganox PS 800, Ciba-Geigy) Thiodicarboxylate component C2: ditetradecyl thiodipropionate (Irganox PS 801, Ciba-Geigy) Thiodicarboxylate component C3: dioctadecyl thiodipropionate (Irganox PS 802, Ciba-Geigy)

Non-ionic emulsifier component D1: ethoxylated octadecenol (10 moles of ethylene oxide to 1 mole of octadecenol) (Emulsifier 0/10, Bayer AG) Non-ionic emulsifier component D2: ethoxylated nonylphenol (Emulsifier NP 10, Bayer AG)

The defoaming mixtures given in Table 1 were emulsified with a high speed stirrer at 70° C in enough water to produce emulsions with a defoamer content of 20 wt. %. These emulsions were then added to the ABS latex in the amounts given in Table 1.

The defoaming effect was assessed using a column with a sieve tray, wherein the behaviour in a degassing column was simulated. The column used had a height (from the sieve tray) of 150 cm and a diameter of 8 cm. The sieve tray plate had 23 holes with each hole having a diameter of 5 mm.

400 ml of latex were introduced and a constant current of air and steam with a rate of flow of 0.8 m/sec was passed through, then the depth of foam resulting after a period of 1 min and the time taken to produce a foam crown of 150 cm (frothing over the top) were measured.

The results are summarised in Table 1.

| Example | Defoaming composition used (parts by wt.) | Amount of defoaming comp. added (w.r.t. polymer) | Depth of foam after 1 min. [cm] | Time to reach a depth of 150 cm [min] |
|---|---|---|---|---|
| 1 | 75 A1 + 7.5 B1 + 12.5 C1 + 5 D1 | 1000 ppm | 70 | 6 |
| 2 | 62.5 A1 + 7.5 B1 + 25 C1 + 5 D1 | 1000 ppm | 80 | 8 |
| 3 | 57.5 A1 + 12.5 B1 + 25 C1 + 5 D1 | 1000 ppm | 70 | 6 |
| 4 | 45 A1 + 25 B1 + 25 C1 + 5 D1 | 1000 ppm | 50 | 7 |
| 5 | 62.5 A1 + 12.5 B1 + 12.5 C1 + 12.5 D1 | 1000 ppm | 60 | 6 |
| 6 | 50 A1 + 12.5 B1 + 2S C1 + 12.5 D1 | 1000 ppm | 60 | 6 |
| 7 | 50 A1 + 20 B1 + 25 C1 + 5 D1 | 1000 ppm | 55 | 8 |
| 8 | 50 A2 + 20 B1 + 25 C2 + 5 D1 | 1000 ppm | 50 | 8 |
| 9 | 50 A1 + 20 B1 + 25 C3 + 5 D1 | 1000 ppm | 45 | 7 |
| 10 | 50 A2 + 20 B1 + 25 C1 + 5 D2 | 1000 ppm | 50 | 8 |
| 11 | 50 A1 + 20 B1 + 25 C1 + 5 D1 | 500 ppm | 65 | 7 |
| 12 | 50 A1 + 20 B1 + 25 C3 + 5 D2 | 500 ppm | 60 | 7 |
| 13 (comparison) | 50 A1 + 50 B1 | 1000 ppm | 90 | 4 |
| 14 (comparison) | 50 A1 + 50 C1 | 1000 ppm | 95 | 4 |
| 15 (comparison) | 50 A1 + 50 D1 | 1000 ppm | 110 | 3 |
| 16 (comparison) | — | — | 100 | 3 |

We claim:
1. A mixture suitable for use as a defoamer comprising:
   A) 30 to 85 parts by weight of a $C_{10}$–$C_{20}$ alcohol;
   B) 5 to 30 parts by weight of a mineral oil;
   C) 5 to 40 party by weight of an ester from a thiodicarboxylic acid with 4 to 8 carbon atoms and an alcohol with 10 to 20 carbon atoms; and
   D) 2 to 15 parts of a non-ionic emulsifier.
2. A mixture according to claim 1, wherein A) is octadecanol, octadecenol, or a mixture thereof; B) is a paraffin oil; C) is didodecyl thiodipropionate; and D) is an alkoxylated fatty alcohol, an alkoxylated alkylphenol, or a mixture thereof.
3. A process for removing residual monomers from acrylonitrile-butadiene-styrene polymer latices, comprising adding to an acrylonitrile-butadiene-styrene polymer latex a defoaming mixture as claimed in claim 1 and then degassing the latex.
4. Acrylonitrile-butadiene-styrene polymer latices obtained by the process as claimed in claim 3.
5. A defoaming mixture comprising the mixture of claim 1 in the form of an aqueous emulsion or dispersion containing 1 to 60 weight percent solids.

* * * * *